United States Patent [19]

Nadalutti

[11] Patent Number: 5,048,675
[45] Date of Patent: Sep. 17, 1991

[54] BELT CONNECTION FOR CONVEYOR BELTS

[75] Inventor: Ilio Nadalutti, Holzheim, Fed. Rep. of Germany

[73] Assignee: Mühlen Sohn GmbH & Co., Blaustein, Fed. Rep. of Germany

[21] Appl. No.: 652,056

[22] Filed: Feb. 6, 1991

[30] Foreign Application Priority Data

Dec. 6, 1990 [DE] Fed. Rep. of Germany ... 9016586[U]

[51] Int. Cl.$^5$ .............................................. B65G 15/30
[52] U.S. Cl. ................................. 198/844.2; 24/33 P; 474/255
[58] Field of Search ...................... 198/844.2; 24/31 R, 24/31 H, 33 A, 33 B, 33 C, 33 M, 33 P; 474/255, 256; 403/229

[56] References Cited

U.S. PATENT DOCUMENTS

| 2,158,007 | 5/1939 | Ellis, 3D et al. | 24/33 C |
|---|---|---|---|
| 2,179,655 | 11/1939 | Cutler | 474/255 X |
| 2,228,926 | 1/1941 | Matthaei et al. | 24/33 C |
| 3,581,348 | 6/1971 | Lister | 474/255 X |
| 3,664,490 | 5/1972 | Maruyama | 474/255 X |
| 4,344,209 | 8/1982 | Harwood | 198/844.2 X |
| 4,364,421 | 12/1982 | Martin | 474/255 X |
| 4,418,726 | 12/1983 | Josef et al. | 24/33 C X |
| 4,574,435 | 3/1986 | Luciano et al. | 24/33 M X |
| 4,671,403 | 6/1987 | Schick | 198/844.2 |
| 4,911,683 | 3/1990 | Legge et al. | 474/255 |

Primary Examiner—D. Glenn Dayoan
Attorney, Agent, or Firm—Robert W. Becker & Associates

[57] ABSTRACT

A belt connection for conveyor belts, especially for a conveyor belt made of heavy textile fabric and used in an apparatus for manufacturing corrugated paper or cardboard, is provided wherein each one of two belt ends to be connected, at a face thereof, is equipped with a plurality of U-shaped clasps that are arranged adjacent to one another in a direction transverse to a longitudinal center axis of the belts and are spaced at a distance from one another. The clasps are attached to the belt ends in such a manner that, at the respective faces that are opposite each other, a respective receiving channel is formed that extends in a direction transverse to the longitudinal center axis of the belts. The clasps of the opposite faces engage and intermesh in a hinge-type fashion whereby the clasps when engaged in that hinge-type fashion are secured via a connecting rod inserted into the intermeshing receiving channels. In order to achieve a planar contact surface for material to be transported on the conveyor belt, the clasps and sections of the belt ends in which the clasps are fastened are coated with flocculent material.

8 Claims, 2 Drawing Sheets

BELT CONNECTION FOR CONVEYOR BELTS

BACKGROUND OF THE INVENTION

The present invention relates to a belt connection for conveyor belts, especially for a conveyor belt made of heavy textile fabric and used in an apparatus for manufacturing corrugated paper or cardboard, wherein each one of two belt ends to be connected, at a face thereof, is provided with a plurality of U-shaped clasps that are arranged adjacent to one another in a direction transverse to a longitudinal center axis of the belts and are spaced at a distance from one another. The clasps are attached to the belt ends in such a manner that, at the respective faces that are opposite each other, a respective receiving channel is formed that extends in a direction transverse to the longitudinal center axis of the belts. The clasps of the opposite faces engage and intermesh in a hinge-type fashion whereby the clasps when engaged in that hinge-type fashion are secured via a connecting rod inserted into the intermeshing receiving channels.

Belt connections are known in which a plurality of U-shaped claps, that are arranged adjacent to one another in a direction transverse to a longitudinal center axis of the belts and are spaced at a distance from one another, are attached to the two belt ends to be connected. The clasps that are arranged on the faces of the belt ends to be connected engage and intermesh, thereby forming a receiving channel for a connecting rod. In this manner a hinge-type connection is achieved.

The belt connection itself and the fastening of the clasps at the belt ends cause uneven surface areas at the conveyor belt which may result in impressions in the transported goods. With conveyor belts used in an apparatus for producing corrugated paper or cardboard, undesired impressions may result from these uneven surface areas in the belt connection region when the corrugated paper or cardboard passes through the pasting unit of the apparatus.

It is therefore an object of the present invention to provide a belt connection for conveyor belts in which the uneven surface areas in the region of the belt connection are eliminated.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The belt connection for conveyor belt of the present invention is primarily characterized by the clasps being coated with flocculent material in the region of the belt connection whereby uneven surface areas are compensated. Impressions in the transported goods are thus prevented.

Preferably, the flocculent material is arranged only on the outside of the clasps in order not impair the movability of the hinge-type connection.

In a preferred embodiment of the present invention, each section of the belt end in which the clasps are fastened is coated with the flocculent material to provided an even and smooth contacting surface for the goods to be transported. Advantageously the belt end is coated on both sides with the flocculent material thus generating a region of flocculent material of the same dimension on the upper side and on the bottom side of the belt having an even and smooth surface.

DESCRIPTION OF PREFERRED EMBODIMENTS

The present invention will now be described in detail with the aid of several specific embodiments utilizing FIGS. 1 through 3.

Figure 1:
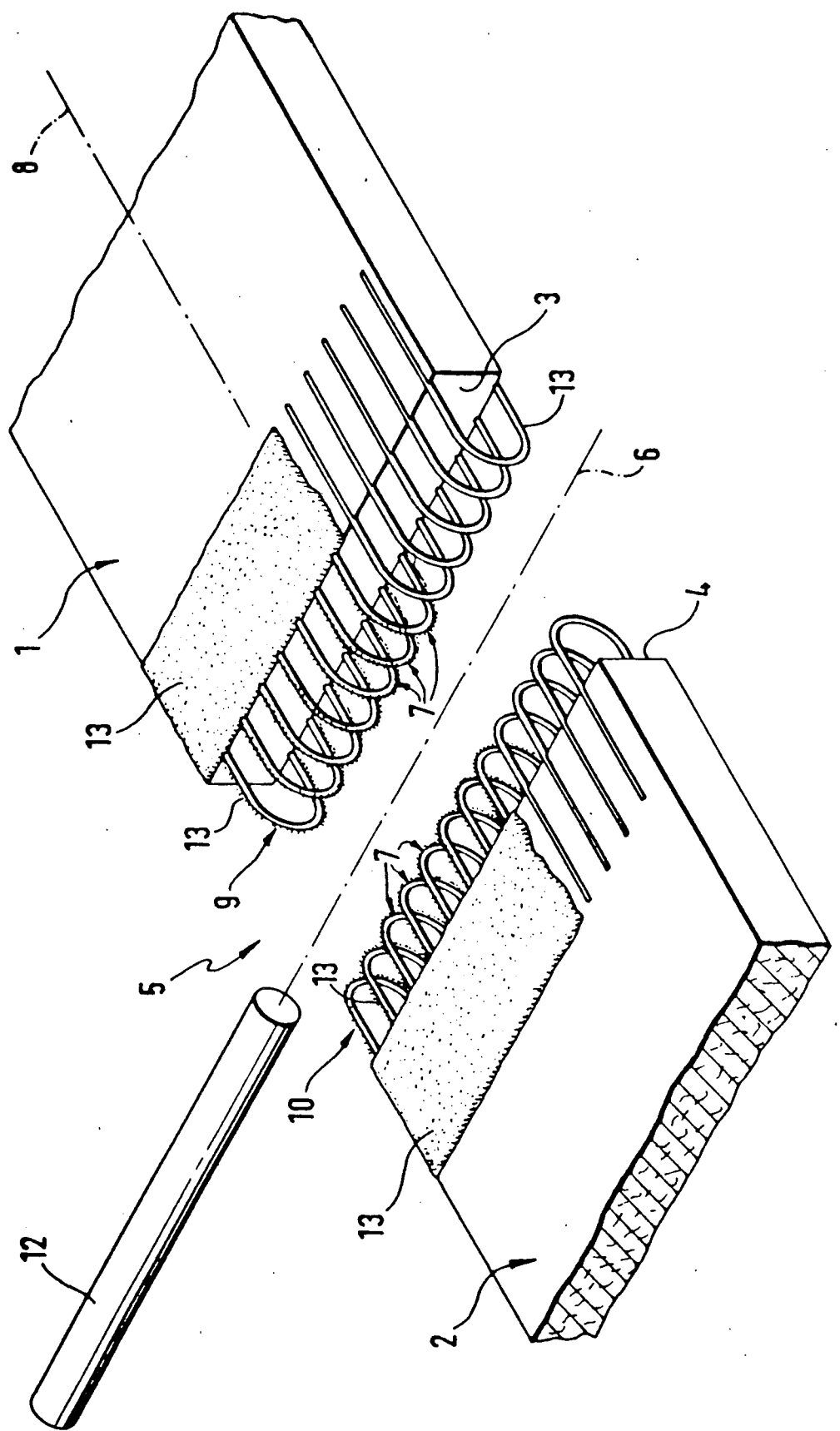
FIG. 1 is a perspective exploded view of an inventive belt connection.

In FIG. 1, the belt ends 1 and 2 of a conveyor belt are shown which are connected in a pivotable manner via the inventive belt connection 5 to form an endless conveyor belt. The belt ends are pivotable about an axis 6 that is arranged perpendicular to the longitudinal central axis 8 of the belts. In the represented embodiment the conveyor belt is formed of a heavy textile fabric and serves as a transporting means in an apparatus for the manufacture of corrugated paper or cardboard.

The belt connection 5 consists of clasps 7 that intermesh in a hinge-type fashion. A plurality of clasps 7 is attached to each one of the belt ends 1 and 2 such that the clasps 7 are adjacent to one another in a direction transverse to a longitudinal center axis 8 of the belts and are spaced at a distance from one another. Each individual U-shaped clasp 7 is fastened with one leg to the upper side of the respective belt end 1, 2 and with the other leg to the bottom side of the respective belt end 1, 2 (FIG. 2). Preferably, the legs of the clasps engage the belt ends 1, 2 in a form-locking manner. Each clasp delimits, together with the respective faces 3 or 4 of the belt ends 1, 2, a receiving means. A respective receiving channel 9, 10 that is extending along the respective face 3 or 4 of the belt end 1 or 2 is formed by the receiving means that are arranged one after another in a direction transverse to the longitudinal center axis 8 of the belts, whereby the clasps 7 are arranged over the entire length of the faces 3, 4 of the belt ends 1, 2.

The distance between adjacent clasps 7 is selected such that the clasps 7 of the first belt end 1 intermesh with the clasps 7 of the second belt end 2, thereby forming a hinge-type belt connection 5.

Figure 2:
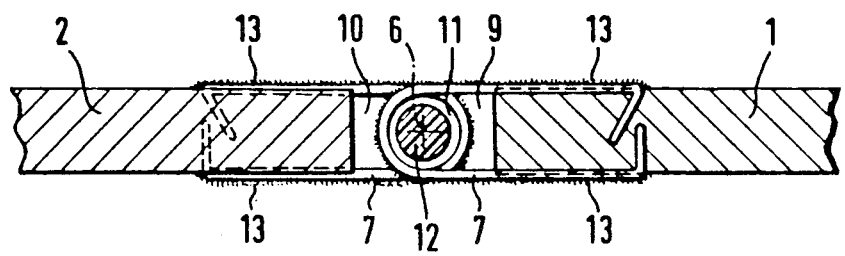
FIG. 2 is a cross-sectional view of the mounted belt connection.
Figure 3:
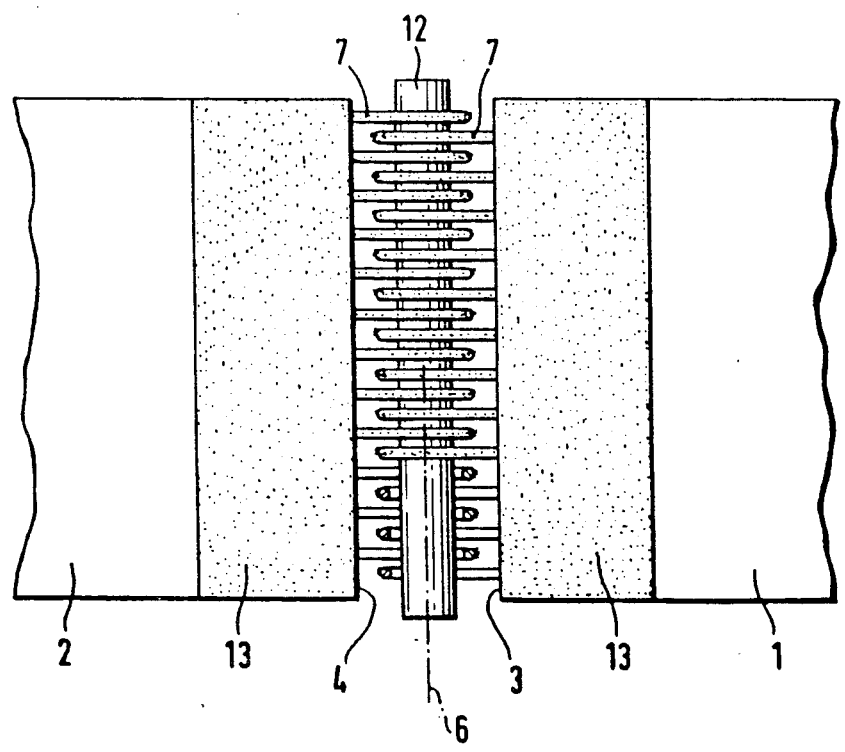
FIG. 3 a plan view of the belt connection with clasps shown in a part-sectional view.

It can be taken from the FIGS. 2 and 3 that the intermeshing clasps 7 delimit a receiving channel 11 into which a connecting rod 12 is inserted perpendicular to the longitudinal center axis 8 in order to secure the hinge-type connection.

To compensate the unevenness of the contact surface of the conveyor belt created by the belt connection 5, the clasps 7 are inventively coated with flocculent material 13. It is preferred to coat only the outer sides of the claps 7. In the embodiment represented in FIGS. 1-3, the respective section of the belt ends 1, 2 in which the clasps 7 are fastened is entirely coated with the flocculent material to compensate for uneveness. The coating is applied to both sides of the sections of the belt ends 1, 2 in order to equalize unevenness on both sides of the conveyor belt. The dimensions of the sections coated with the flocculent material on the upper side and the bottom side are of equal dimensions.

A polyamide flocculent material of a size of 6.7 dtex (decitex) preferably semi-matt is employed. The length of the flocculent material is preferably 1.5 mm.

The flocculent material is glued to the surface with a two-component adhesive. A preferred two-component adhesive comprises polyisocyanate as the first component and polyester polyol as the second component. The components are advantageously in the liquid phase.

After the two-component adhesive has been applied to the areas to be coated with the flocculent material according to the invention, the flocculent material is applied and the adhesive is cured at approximately 120° C. for approximately 20 min with heat radiating means.

Instead of the individual clasps 7, wire coils may be provided at the respective faces 3, 4 of the belt ends 1, 2. Each respective wire coil penetrates the respective belt end 3, 4 from the upper side to the bottom side or vice versa. The wire coil is thus attached to the belt end in a formlocking manner.

As demonstrated in the preferred embodiment, the clasps 7 are arranged such that the pivoting axis 6 of the belt connection 5 is always perpendicular to a plane delimited by one individual clasp 7.

The present invention is, of course, in no way restricted to the specific disclosure of the specification, examples and drawings, but also encompasses any modifications within the scope of the appended claims.

What is claimed is:

1. In a belt connection for conveyor belts wherein each one of two belt ends to be connected, at a face thereof, is provided with a plurality of U-shaped clasps that are arranged adjacent to one another in a direction transverse to a longitudinal center axis of said belts and are spaced at a distance from one another, with said clasps being attached to said be? t ends in such a manner that, at said respective faces that are opposite each other, a respective receiving channel is formed that extends in a direction transverse to said longitudinal center axis of said belts, with said clasps of said opposite faces engaging and intermeshing in a hinge-type fashion whereby said clasps when engaged in said hinge-type fashion are secured via a connecting rod inserted into said intermeshing receiving channels, the improvement wherein:

said clasps are coated with flocculent material.

2. A belt connection for conveyor belts according to claim 1, in which said flocculent material is arranged exclusively on outwardly facing portions of said clasps.

3. A belt connection for conveyor belts according to claim 1, in which a respective section of said belt ends in which said clasps are fastened are entirely coated with said flocculent material to achieve a planar contact surface for material to be transported on said conveyor belt.

4. A belt connection for conveyor belts according to claim 3, in which said sections of said belt ends are coated on respective bottom and upper sides thereof with said flocculent material.

5. A belt connection for conveyor belts according to claim 1, in which said flocculent material is a polyamide of a length of approximately 1.5 mm.

6. A belt connection for conveyor belts according to claim 1, in which said flocculent material is fastened with a two-component adhesive.

7. A belt connection for conveyor belts according to claim 6, in which said two-component adhesive comprises liquid polyisocyanate and liquid polyester polyol.

8. A belt connection for conveyor belts according to claim 6, in which said adhesive is cured in a heat treatment at approximately 120° C. for approximately 20 min.

* * * * *